United States Patent
Hälleberg et al.

(10) Patent No.: US 8,738,252 B2
(45) Date of Patent: May 27, 2014

(54) METHOD AND SYSTEM FOR DRIVING OF A VEHICLE

(75) Inventors: Roger Hälleberg, Nacka (SE); Anders Jensen, Gnesta (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 13/515,859

(22) PCT Filed: Dec. 16, 2010

(86) PCT No.: PCT/SE2010/051403
§ 371 (c)(1),
(2), (4) Date: Jun. 14, 2012

(87) PCT Pub. No.: WO2011/075068
PCT Pub. Date: Jun. 23, 2011

(65) Prior Publication Data
US 2012/0253617 A1    Oct. 4, 2012

(30) Foreign Application Priority Data
Dec. 17, 2009   (SE) ...................................... 0950976

(51) Int. Cl.
  *B60K 17/06* (2006.01)
(52) U.S. Cl.
  USPC .............................................. 701/54; 701/66
(58) Field of Classification Search
  USPC ....................................................... 701/54, 66
  See application file for complete search history.

(56) References Cited

U.S. PATENT DOCUMENTS

| | | | |
|---|---|---|---|
| 5,754,968 A * | 5/1998 | Hedstrom | 701/66 |
| 2006/0046896 A1* | 3/2006 | Nakajima et al. | 477/107 |
| 2008/0183371 A1 | 7/2008 | Wolfgang et al. | 701/103 |

FOREIGN PATENT DOCUMENTS

| | | |
|---|---|---|
| EP | 0 947 738 | 10/1999 |
| EP | 1 031 768 | 8/2000 |
| EP | 2 050 989 | 4/2009 |
| JP | 11-034694 | 2/1999 |
| JP | 2002-122221 | 4/2002 |
| JP | 2005-075179 | 3/2005 |
| KR | 10-1999-0040 | 6/1999 |

OTHER PUBLICATIONS

International Search Report mailed Mar. 24, 2011 in corresponding PCT International Application No. PCT/SE2010/051403.
Japanese Office Action, dated Oct. 22, 2013, issued in corresponding Japanese Patent Application No. 2012-544438. English translation. Total 7 pp.
Korean Office Action, dated Aug. 8, 2013, issued in corresponding Korean Patent Application No. 10-2012-7018809. Includes English translation. Total 14 pp.

\* cited by examiner

*Primary Examiner* — Mary Cheung
*Assistant Examiner* — Yuen Wong
(74) *Attorney, Agent, or Firm* — Ostrolenk Faber LLP

(57) ABSTRACT

A method for driving a vehicle in which a gearbox connected to a combustion engine can be set to various different transmission ratios including a low transmission ratio in which the engine speed is below that at which a torque plateau for the low ratio is reached. The vehicle may drive in a first mode or a second mode both at the low ratio, such that in the first mode, the vehicle is driven without fuel supply to the engine and in the second mode, the engine is provided with fuel supply in order to deliver motive force for propulsion of the vehicle. In the method one determines whether the vehicle should be driven according to the first mode or the second mode, based on a need for motive force.

23 Claims, 4 Drawing Sheets

METHOD AND SYSTEM FOR DRIVING OF A VEHICLE

CROSS-REFERENCE TO RELATED APPLICATIONS

The present application is a 35 U.S.C. §§371 national phase conversion of PCT/SE2010/051403, filed Dec. 16, 2010, which claims priority of Swedish Application No. 0950976-1, filed Dec. 17, 2009, the contents of which are incorporated by reference herein. The PCT International Application was published in the English language.

FIELD OF THE INVENTION

The present invention relates to a method for driving a vehicle, particularly in which a gearbox connected to a combustion engine can be set to various different transmission ratios, in a situation where there is a reduced need for power output to propel the vehicle.

BACKGROUND TO THE INVENTION

In driving of heavy vehicles such as trucks, buses and the like, vehicle economy has over time become an ever greater factor in the profitability of the activity in which the vehicle is used. Apart from its procurement cost, the main costs involved in routine operation of a heavy vehicle normally comprise pay for the driver, repair and maintenance costs, and fuel for propulsion of the vehicle.

Depending on the type of vehicle, the impact of different factors may vary, but fuel consumption is generally a major item of expenditure, and since the capacity utilisation of heavy vehicles is often high, involving a large overall fuel consumption, every possible way of reducing fuel consumption has a positive effect on profitability.

On long-distance runs it is particularly important to optimise fuel consumption. To this end there are long-distance vehicles characterised by a typical engine cruising speed for a certain vehicle cruising speed. Typical vehicle cruising speeds, depending on the region or type of road, may for example be 80 km/h, 85 km/h or 89 km/h.

For heavy vehicles in general, various different power train configurations are available, but since it is often desirable that such vehicles be drivable as comfortably as possible for the driver they are often provided with automatically operated gearboxes such that gear changes are controlled by the control system usually incorporated in the vehicle.

The fact that automatic gear change systems in heavy vehicles are usually controlled by the control system makes it possible, a possibility which is often applied, to use a control arrangement whereby control of engine and gearbox is conducted partly on the basis of commands from the vehicle driver but also to a large extent by the control system. For this reason the control system often also incorporates functions for improving fuel consumption by as far as possible effecting gear changes and gear choices in as fuel-economising a way as possible.

An example of such a function is a function whereby when the vehicle is on a downgrade its engine is disconnected from its powered wheels when no torque contribution is required to maintain the vehicle's speed. The vehicle's power train is subsequently reconnected when, for example, the driver presses the accelerator pedal or the brake pedal.

Although the aforesaid disconnecting function may work well in many cases, there are still situations where the fuel consumption of vehicles powered by a combustion engine can be further reduced.

SUMMARY OF THE INVENTION

An object of the present invention is to propose a method for control of a gearbox of a vehicle whereby the latter's fuel consumption can be reduced.

The present invention pertains to a method for driving of a vehicle in which a gearbox connected to a combustion engine can be set to various different transmission ratios and is settable to a low transmission ratio in which the engine speed is below that at which the torque plateau for said low ratio is reached. The vehicle is adapted to driving in a first mode and a second mode at said low ratio, such that in said first mode the vehicle is driven without fuel supply to said engine and in said second mode said engine is provided with fuel supply to deliver motive force for propulsion of said vehicle. The method comprises determining whether the vehicle should be driven according to said first mode or said second mode, on the basis of a need for motive force.

This affords the advantage that the vehicle can be driven in an overdrive gear in two different ways. In a first mode the vehicle is driven with the engine trailing, i.e. with no fuel supplied to the engine and consequently no fuel consumption. This affords the advantage that the vehicle may be driven on, for example, a downhill run without fuel consumption while at the same time the low engine speed due to the overdrive results in a low engine brake torque being applied to the vehicle's drive shafts.

Alternatively, in said second mode, the engine may contribute appropriate motive force up to the (reduced) motive force (power output) which it can deliver at its speed at the time, in order thereby to increase the degree of utilisation of the overdrive so that the vehicle can be driven with overdrive engaged for longer than with the engine trailing, before having to change down to a lower gear (a higher transmission ratio). For example, the vehicle may be driven with overdrive engaged on a downgrade which results in a reduced need for power output, but on which a contribution is required from the engine to enable the vehicle speed to be maintained, or the vehicle may be driven for as long as possible without its speed deviating too far from a reference speed, e.g. a set cruise control speed or some other speed indicated in the vehicle's control system.

Determining whether the vehicle should be driven with overdrive engaged according to said first mode or said second mode is done by determining a need for motive force, and changing to said low transmission ratio may be done on the basis of a need for motive force, e.g. when the need for motive force is reduced or will be reduced within a first time. A vehicle driven for example on a downgrade is subject to a decreased need for motive force (power output) for its propulsion, since the earth's power of attraction contributes a forward motive force component such that the need for motive force from the vehicle's engine to propel the vehicle may be reduced or even cease altogether.

The determination may be done when the vehicle is being driven, or should be driven, in said low transmission ratio. Determination of the need for motive force and determining whether the vehicle should be driven according to said first mode or said second mode may be done by determination means comprising at least one control unit forming part of the vehicle's control system.

In an embodiment, the need for motive force is determined by determining the vehicle's running resistance. The running resistance is a total representation of the resultant of the forces which act upon the vehicle during operation, and may be calculated on the basis of knowing the vehicle's speed, the engine's propulsive torque, the vehicle's configuration and other ambient data. The running resistance may be used as a representation of the road gradient.

The vehicle may for example be driven according to said first mode if the absolute amount of its running resistance is below a first value, and according to said second mode if the absolute value of its running resistance is below a second value, said first value possibly being lower than said second value.

In an embodiment, the need for motive force is determined by determining a speed parameter. The speed parameter may for example take the form of determination of the speed which the vehicle will reach at a certain point on a downgrade, or the highest speed which it will reach on, for example, a downgrade. Calculating this speed makes it possible to determine suitable modes for driving of the vehicle. Expected vehicle speeds may for example be determined on the basis of data concerning the topography of the road ahead of the vehicle.

Determining whether the vehicle should be driven according to said first mode or said second mode may for example be done when the vehicle is being driven with activated cruise control function, in which case the present invention may with advantage be used for driving the vehicle in a fuel-economising way with activated cruise control function.

Further characteristics of the present invention and advantages thereof will be indicated by the detailed description of examples of embodiments set out below and the attached drawings.

DETAILED DESCRIPTION OF EXAMPLES OF EMBODIMENTS

The term overdrive is normally taken to mean a gear in which the output shaft of the gearbox rotates faster than the engine shaft.

In the description and claims set out below, however, the term overdrive is confined to denoting a gear in which the vehicle, at its cruising speed, runs at an engine speed which is below that at which the torque plateau for the gear is reached. This means that maximum torque will not be available in such a gear, rendering that gear unusable except in situations where the need for motive force is reduced.

Figure 1A:
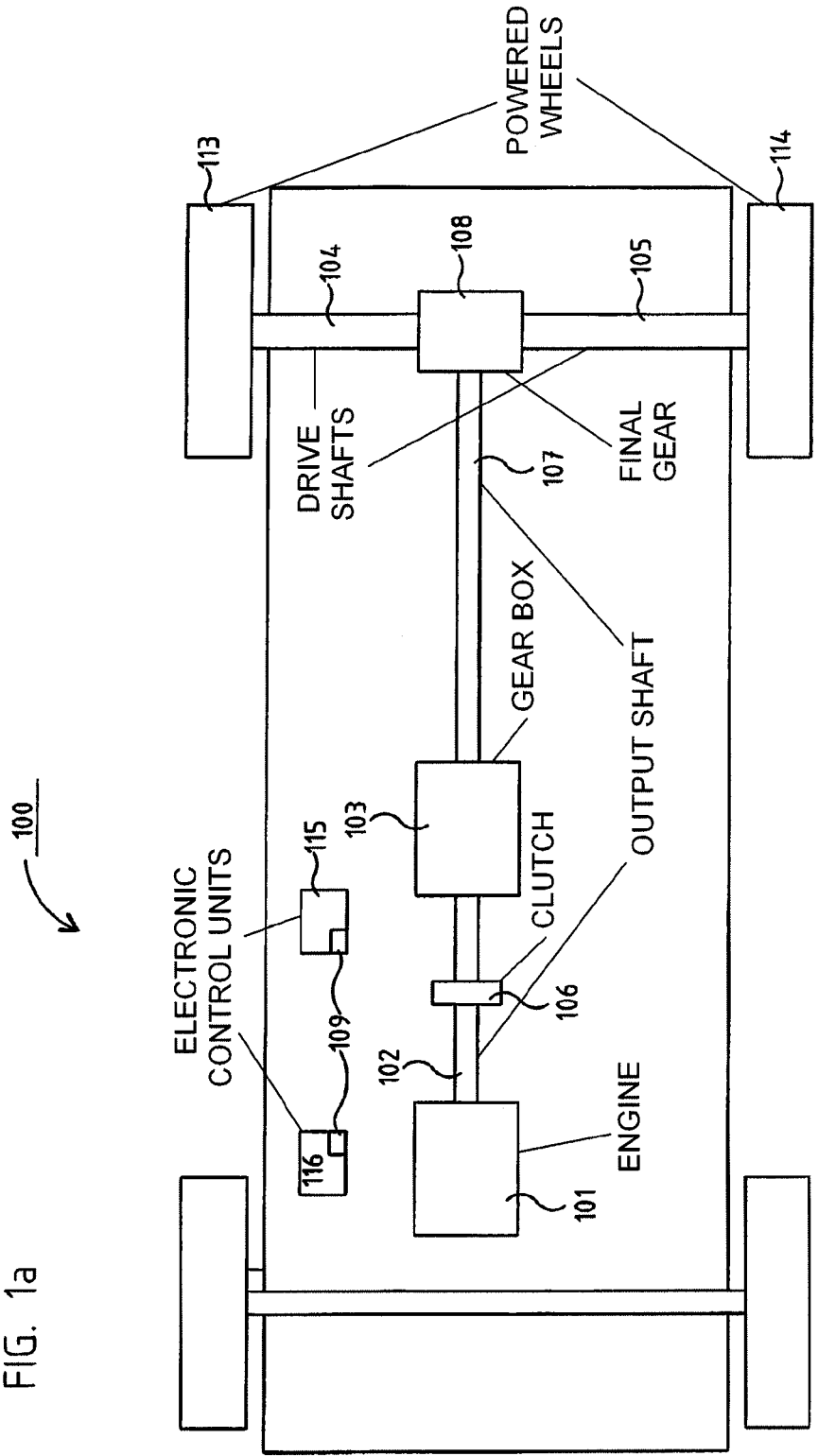
FIG. 1a depicts a power train in a vehicle in which the present invention may with advantage be used.

FIG. 1a depicts an example of a power train in a heavy vehicle 100, e.g. a truck, bus or the like, according to an example of an embodiment of the present invention. The vehicle 100 schematically depicted in FIG. 1a has only one axle with powered wheels 113, 114 but the invention is also applicable in vehicles which have more than one axle provided with powered wheels. The power train comprises a combustion engine 101 connected in a conventional way, via an output shaft 102 of the engine 101, usually via a flywheel (not depicted), to an automatically operated gearbox 103 via a clutch 106.

However, heavy vehicles used largely in agriculture or on motorways are usually provided not with automatic gearboxes in a traditional sense but with "manual" gearboxes in which gear changing is controlled by a control system. This is partly because manual gearboxes are substantially less expensive to manufacture, but also because of their greater efficiency and consequently lower fuel consumption.

The clutch 106 in the embodiment depicted takes the form of an automatically controlled clutch of conventional type, e.g. of disc type. The opening/closing of the clutch is controlled by the vehicle's control system. This is also usual in the case of a manually controlled clutch, such that gear changes after the vehicle has been set in motion take place with closed clutch by appropriate control of the engine during gear changes.

Control systems in modern vehicles usually consist of a communication bus system comprising one or more communication buses for connecting together a number of electronic control units (ECUs), or controllers, and various components located on the vehicle. Such a control system may comprise a large number of control units, and the responsibility for a specific function may be divided between two or more of them. For the sake of simplicity, FIG. 1a depicts only two such electronic control units 115, 116 which respectively control in this embodiment the engine 101 and clutch 106 (in the case with automatically controlled clutch) and the gearbox 103 (two or more from among engine, gearbox and clutch may alternatively be arranged to be controlled by just one control unit). The control of engine, clutch and gearbox by the control units 115, 116 normally depends on signals both from one or the other and also from other control units. Control units of the type depicted are normally adapted to receiving sensor signals from various parts of the vehicle, e.g. from gearbox, engine, clutch and/or other control units or components of the vehicle. The control units are further adapted to delivering control signals to various parts and components of the vehicle, e.g. engine, clutch and gearbox, for their control. The present invention may be implemented in any of the above control units, or in some other suitable control unit in the vehicle's control system.

The control of various parts and components of the vehicle, e.g. choice of gears, is often governed by programmed instructions. These programmed instructions take typically the form of a computer program which, when executed in a computer or control unit, causes the computer/control unit to effect desired forms of control action, e.g. method steps according to the present invention. The computer program usually takes the form of computer program products 109 which are stored on a digital storage medium 121 (see FIG. 1b), e.g. ROM (read-only memory), PROM (programmable read-only memory), EPROM (erasable PROM), flash memory, EEPROM (electrically erasable PROM), a hard disc unit etc., in combination with or in the control unit, and are executed by the control unit. The vehicle's behavior in a specific situation can thus be adjusted by altering the computer program's instructions.

Figure 1B:
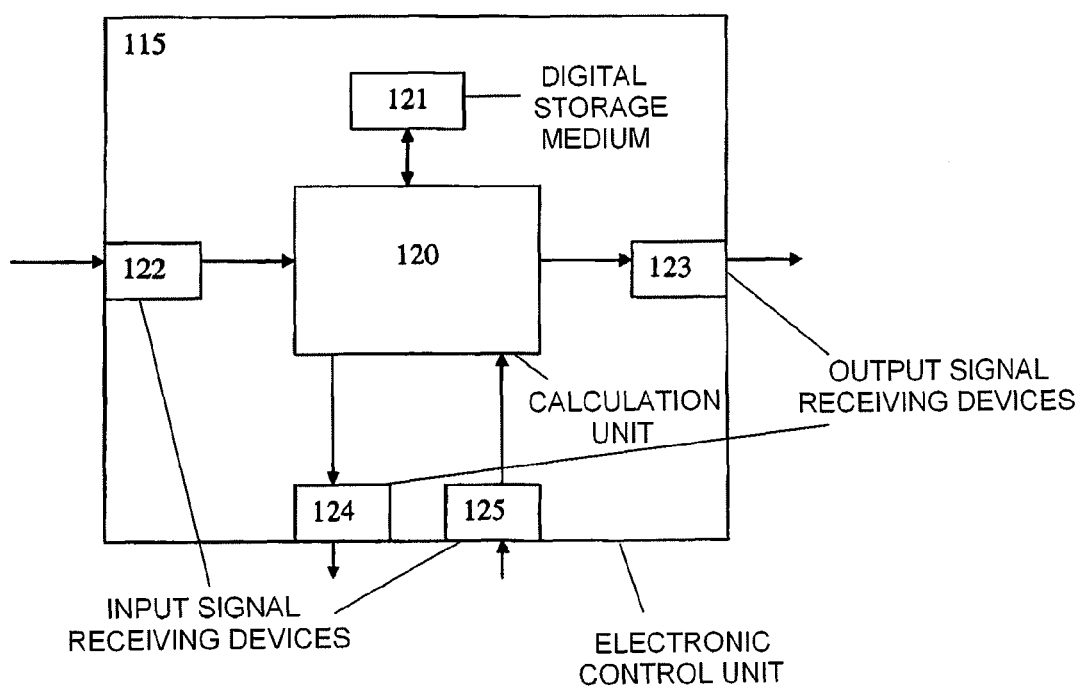
FIG. 1b depicts an example of a control unit in a vehicle control system.

An example of a control unit (the control unit 115) is depicted schematically in FIG. 1b and may comprise a calculation unit 120 which may take the form of substantially any suitable type of processor or microcomputer, e.g. a circuit for digital signal processing (Digital Signal Processor, DSP), or a circuit with a predetermined specific function (Application Specific Integrated Circuit, APIC). The calculation unit 120 is connected to a memory unit, digital storage medium 121, which is situated in the control unit 115 and which provides the calculation unit 120 with, for example, the stored program code and/or the stored data which the calculation unit 120 needs in order to be able to perform calculations. The calculation unit 120 is also adapted to storing partial or final results of calculations in the memory unit.

The control unit 115 is further provided with devices 122, 123, 124, 125 for receiving and sending input and output signals. These input and output signals may comprise waveforms, pulses or other attributes which the input signal receiving devices 122, 125 can detect as information and which can be converted to signals processable by the calculation unit 120. The output signal sending devices 123, 124 are adapted to converting signals received from the calculation unit 120 in order, e.g. by modulating them, to create output signals which can be transferred to other parts of the vehicle's control system and/or the component/components for which the signals are intended.

Each of the connections to the devices for receiving and sending input and output signals may take the form of one or more from among a cable, a data bus, e.g. a CAN (Controller Area Network) bus, a MOST (Media Orientated Systems Transport) bus or some other bus configuration, or a wireless connection.

The vehicle 100 further comprises drive shafts 104, 105 connected to its powered wheels 113, 114 and driven by an output shaft 107 from the gearbox 103 via a final gear 108, e.g. a conventional differential.

The depicted gearbox 103 in the vehicle 100 is provided with at least one overdrive gear adapted to having an operating range below the torque plateau for that gear at the vehicle's cruising speed as described above. This means that the vehicle normally cannot be driven with such a type of overdrive engaged, since the engine's speed at the operating point will usually be too low to be able to deliver enough torque, and in addition, as soon as the need for motive force increases, the engine will drop to a lower speed at which still less power is available and there is risk of the engine stopping.

The object of such an overdrive is instead to minimise parasitic losses, and hence fuel consumption, in operating conditions where there is a reduced or no need for power output. This is utilised by the present invention, and an example of an embodiment of a method according to the present invention is illustrated in FIG. 2.

Figure 2:
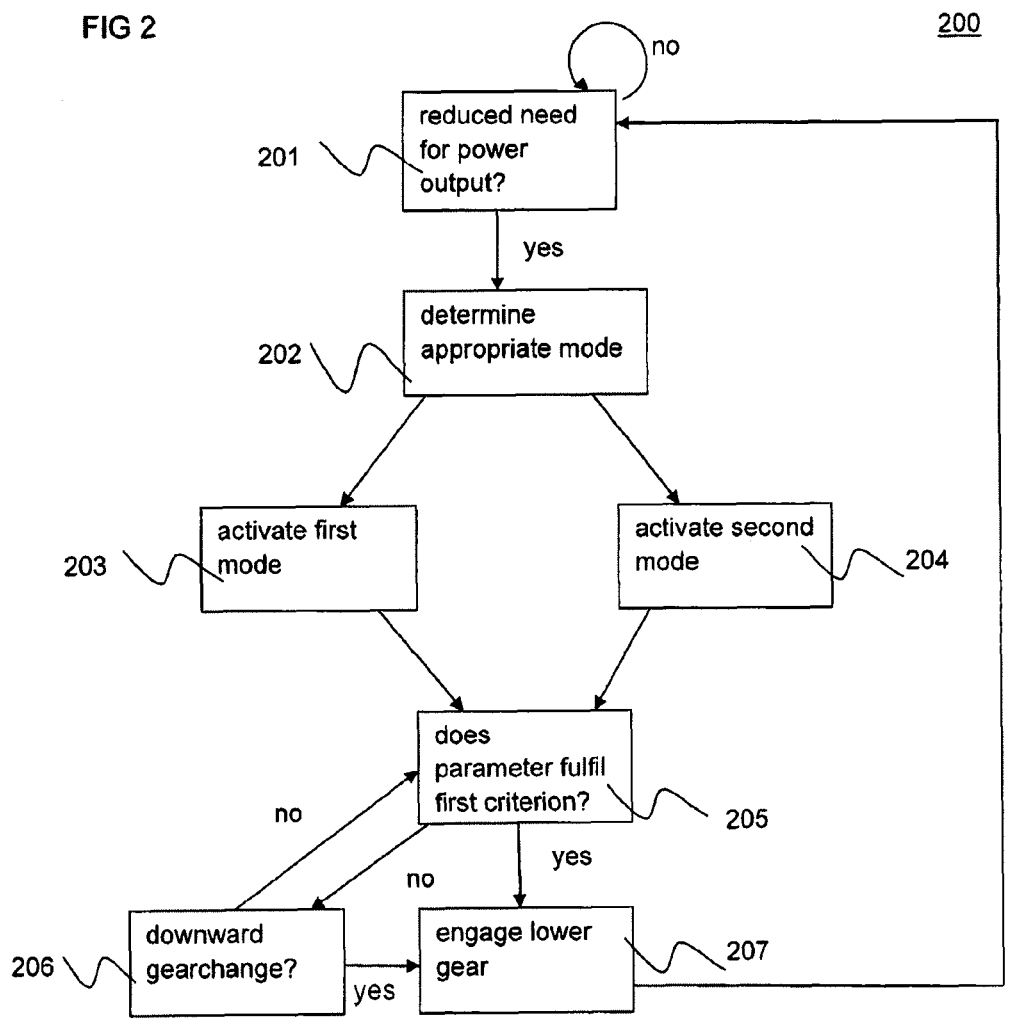
FIG. 2 is a flowchart illustrating an example of a method for control of a gearbox according to an example of an embodiment of the present invention.

FIG. 2 is a flowchart showing steps performed during control of an engine/gearbox according to an example of a method 200 of the present invention. Step 201 determines whether there is or will soon be a low need for power output. A low such need may typically be determined if the power output needed to propel the vehicle at its speed at the time is lower than a threshold value.

If the vehicle is for example on a downgrade, the power output needed to propel it is reduced because the earth's power of attraction by gravity on downgrades (as opposed to upgrades) contributes a positive (forward) motive force component such that the need for power output from the engine to propel the vehicle may decrease markedly or even cease altogether. The power output extractable via the overdrive (the available torque) may therefore in many cases be sufficient to make it possible to drive the vehicle at an unchanged or substantially unchanged speed despite the low engine speed.

If at step 201 it is determined that there is or soon will be a reduced or no need for motive force, which may be done in various different ways as exemplified below, the process moves on to step 202 where an appropriate mode for driving of the vehicle is determined.

The present invention utilises the potential of two ways of reducing fuel consumption with overdrive engaged, in a first mode by driving the vehicle with overdrive engaged but engine trailing, i.e. the vehicle being driven without fuel supply to the engine, or in a second mode by driving the vehicle with fuel supply to the engine to enable it to deliver motive force up to the maximum which is deliverable at the overdrive's low speed.

Step 202 thus does a determination as to whether from a fuel consumption or some other point of view it is more advantageous to drive the vehicle according to said first mode or according to said second mode.

Depending on, for example, the road gradient at the time and the vehicle speed at the time, there may be different degrees of advantage in driving the vehicle according to said first mode or said second mode. Switching the gearbox to the overdrive also affords the advantage that the engine speed goes down to a very low value and the level of noise from the engine drops. The mode determination may for example be done on the basis of the vehicle's running resistance and/or the topology of the road ahead of the vehicle, and it may for example be done by determining (calculating) the speed which the vehicle will reach in each mode.

Figure 3:
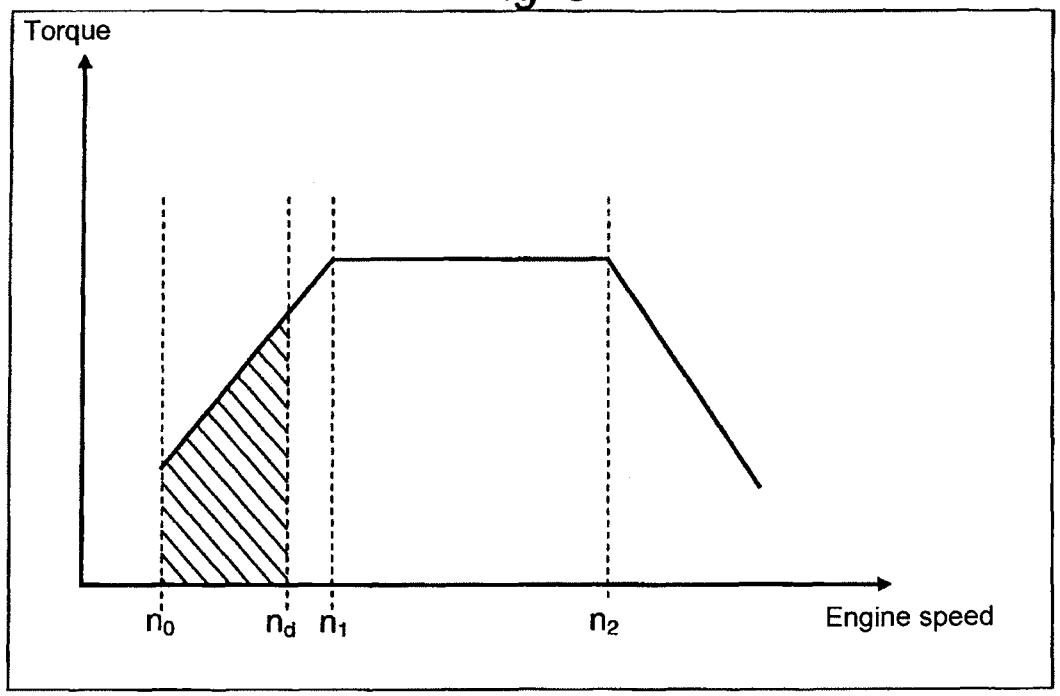
FIG. 3 depicts a torque curve for an engine with indicated limits for an overdriven operating range.

FIG. 3 depicts a torque curve and operating range for an overdrive as described above. The engine speed $n_d$ denotes the engine speed at which the vehicle's cruising speed or maximum permissible speed is reached, with a maximum at $n_1$, so the engine will never run on the torque plateau (the region between n1 and n2) at vehicle cruising speed with overdrive engaged, but always at a lower engine speed and hence lower torque. The overdrive is thus intended to be used at an operating point below the torque plateau for the torque curve, and the operating point $n_d$ can in principle be shifted to any desired point between $n_0$ (a point where the engine can deliver a positive torque) and $n_1$.

In a vehicle with conventional gear changing, the transmission ratios of the gearbox are so arranged that the engine speed at a vehicle's cruising speed will be in the upper part of the torque plateau (i.e. nearer to n2) or alternatively in the middle of the torque plateau (midway between n1 and n2) to achieve good drivability. The vehicle's cruising speed may vary depending on regional regulations or type of road but may for example be 80, 85 or 89 km/h.

The torque T and the power output P are related to one another by the equation $$P=T\omega \quad (1)$$

where $\omega$ is the engine's angular velocity, i.e. $2\pi 60/\text{rpm}$ (where rpm=engine revolutions per minute), which means that the power output P which can be extracted from the engine in the region up to the speed $n_1$ is limited to a lower value than the maximum which the engine can deliver, since both the engine speed and the maximum torque deliverable by the engine are lower. The power output extracted from the engine is thus limited when the overdrive is engaged.

If the vehicle is for example driven at a cruising speed of 80 km/h and the control unit 115 (or 116) determines that there is a low need for power output, e.g. by determination of the vehicle's running resistance, the overdrive can be engaged, resulting in the engine saving fuel. The respective running resistance may be calculated from knowing the vehicle's running speed, the engine's driving torque, the vehicle's configuration and other ambient data. The running resistance is a total representation of the resultant of the headwind, tailwind, rolling resistance, friction and energy consumers in the vehicle and the force of gravity which accelerates/brakes the vehicle, and can therefore be used as a representation of the road gradient.

When the overdrive is engaged as above, the engine will run at a low speed, within the range below the torque plateau depicted in FIG. 2, i.e. at a speed below $n_1$. For example, the power output needed may be regarded as low if it is lower than a certain threshold value. The threshold value may for example be a proportion, e.g. 10-15%, of the maximum power output, or a proportion of the maximum available power output when running on overdrive.

Depending on the power output needed at the time to propel it, the vehicle is therefore driven according to said first mode or said second mode. If it is (or will be) on a downgrade such that its speed increases or is maintained or substantially maintained without fuel supply to the engine, the engine may be "trailed" with fuel injection switched off according to said first mode.

If the vehicle is driven with overdrive engaged on a downgrade which results in a reduced need for power output but is not steep enough to enable it to accelerate/maintain speed purely by gravity, a determination may be done as to whether it is more advantageous for the vehicle to be driven with engine trailing, with the speed decrease which this may entail, or whether it is better for fuel to be supplied. For example, a certain contribution may be required from the engine, e.g. 10-50 kW, for the vehicle speed to be maintained or substantially maintained.

How much power output can be delivered by the engine with overdrive engaged depends on where in the region between $n_0$ and $n_1$ the operating point $n_d$ is, since the torque (and hence the power output as above) varies greatly with the engine speed within the respective operating range.

Trailing the engine at low engine speed also affords the advantage that the braking torque which the engine applies to the drive shafts when the power train is closed will be far less than when trailing at higher engine speeds. This is exemplified in FIG. 4 for an example of a combustion engine where engine friction is plotted against engine speed. The engine friction depends at least partly on friction in bearings and sliding surfaces, and on energy consumed in pumping air, oil and water through the engine.

As may be seen in the drawing, the braking torque applied by the engine is almost twice as great at around 1800 rpm (250 Nm) as at 600 rpm (130 Nm). Since the engine's power output depends on both its torque and its speed, the difference in brake power output will be still greater (47 kW as against 8 kW). Trailing the engine at a lower engine speed thus makes it possible for the vehicle to be driven without fuel consumption with lower brake resistance and therefore to roll for a longer distance before positive torque is again required to propel the vehicle.

As mentioned above, an alternative solution in such a situation is for the engine to be disconnected altogether from the drive shafts so that no braking torque at all is applied from the engine, with still less rolling resistance. This solution does however involve the disadvantage of fuel being consumed all the time to keep the engine running.

Reverting to FIG. 2, when a suitable mode has been determined, the method moves on to step 203 or 204 to activate the applicable mode, whereupon the process moves on to step 205 which determines whether a speed parameter for the vehicle fulfils a first criterion. This may for example take the form of determining whether the vehicle's running speed at the time deviates from a speed reference $H_{ref}$. This may for example be done by determining whether the speed change relative to the speed reference $H_{ref}$ is greater than or equal to a threshold value $H_{thres}$. $H_{thres}$ may for example be a percentage, e.g. 1, 2 or 5%, of the speed reference $H_{ref}$.

The threshold value may be absolute, i.e. irrespective of whether the speed difference is an increase or a decrease, or it may for example be only a decrease. The threshold value may for example also be an actual speed difference, e.g. 1, 2 or 5 km/h.

Alternatively, the speed parameter may for example be a derivative for the vehicle's running speed, in which case the speed change (the derivative) may be compared with a threshold value or reference value.

If the vehicle's speed does not differ from the speed reference $H_{ref}$ by more than said difference, or if for example the absolute amount of the derivative does not exceed a threshold value or deviate from a reference value by more than a specific amount, the process moves on to step 206.

Step 206 determines whether there is any other reason for no longer driving the vehicle with overdrive engaged. If such is not the case, the process goes back to step 205, otherwise it moves on to step 207.

Figure 4:
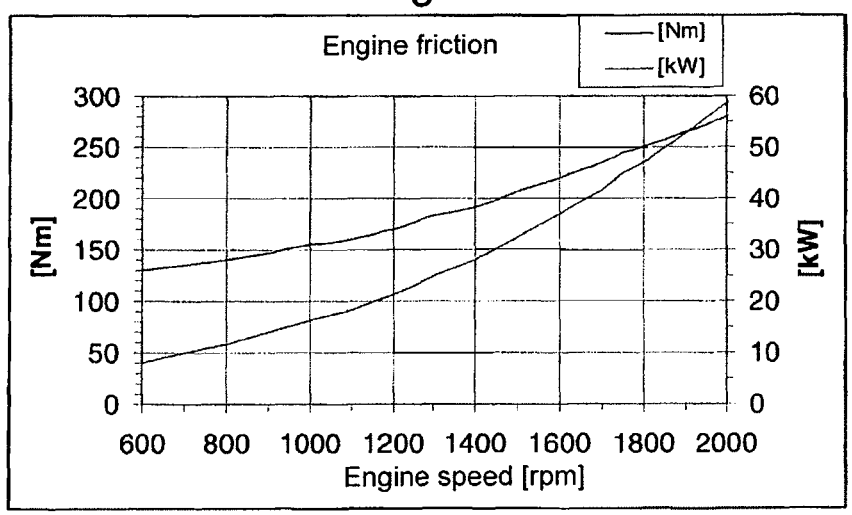
FIG. 4 depicts friction losses in an engine as a function of engine speed.

In contrast, if the speed difference at step 205 exceeds the threshold value $H_{thres}$ or if the derivative exceeds a threshold value or deviates from the reference value by more than a specific amount, the process moves on to step 207, where the gearbox changes down to a lower gear (a higher transmission ratio) to make more motive force available and thereby be able to accelerate the vehicle again to a higher speed, or alternatively, entirely according to FIG. 4, the downward gear change results in more trailing resistance which can be used for engine braking of the vehicle.

A speed decrease may for example be due to the downgrade levelling out or even changing to an upgrade. The process then reverts to step 201 in order once again to be able to change back up to overdrive if there is again a reduced need for motive force.

If the vehicle speed exceeds the reference speed (by more than said threshold value $H_{thres}$) the process can move on to a step (not depicted) where a braking torque is applied, e.g. by using the vehicle's service brake or by using, for example, exhaust brakes, retarder brakes etc., whereupon the process reverts to step 205, where the vehicle speed is again compared with a reference speed.

Instead of using as above a speed parameter at step 205 to determine whether there should be a downward gear change (moving on to step 207), the vehicle's need for motive force may instead be determined in any of the ways described or referred to in this description whereby downward gear change can take place upon increased need for motive force. The process may thereafter return to step 201 for a new determination of the need for motive force.

The present invention may also be used to combine strategies during the downgrade, e.g. the vehicle may be driven on the first part of the downgrade in either of said modes before subsequently being driven in the other mode. The process according to FIG. 2 may therefore comprise, for example, arrows from step 206 to step 203 or 204.

It is possible for it to be determined already at step 202 that a mode change should take place at a certain location or after a certain time, but the change may also be controlled by other factors. For example, mode change may be arranged to take place if for example it is determined that the vehicle's speed at the time deviates from a speed reference $H_{ref}$ by a threshold value $H_{thres}$.

If the vehicle speed is lower, i.e. if it deviates downwards by more than the threshold value $H_{thres}$, it may be determined (in an undepicted step) whether more power output can be extracted from the engine either by switching to said second mode from said first mode or by increasing the power output extracted in said second mode with overdrive still engaged.

The process depicted in FIG. 2 comprises also a superordinate process, step 206. This makes it possible to monitor continuously whether there is any other reason for there to be an increased need for power output from the engine. For example, changing down to a lower gear (a higher transmission ratio) may for example take place when any of the following criteria is fulfilled: vehicle speed increasing to a level set for a cruise control function, vehicle driver moving the accelerator pedal or the brake pedal, vehicle accelerating past a set speed.

The running resistance was used above to determine whether there was a reduced need for motive force. According to an alternative example of an embodiment, data about the road ahead of the vehicle are used to determine whether reduced power output is sufficient to propel the vehicle. For example, data from a look-ahead (LA) function may be used to determine whether reduced power output is required.

The LA function may for example comprise a road gradient database provided in the vehicle, either for all the roads within a geographical area, e.g. a region, a country, a continent etc., or for the road sections along which the vehicle is normally driven. Combining these data with the vehicle's location, obtainable for example via a GPS receiver, makes it possible for the vehicle's control system to be aware of the nature of the road ahead of the vehicle and then use these data in various ways, e.g. for cruise control functions. Alternatively, instead of being stored in a database in the vehicle, road gradient data may be arranged to be sent continuously or at certain intervals to the vehicle via any suitable wireless link, such that data transmitted may for example be controlled by the vehicle's location at the time.

In addition to topographical information, road data may also comprise information about speed limits, road bends etc. These data may also be used in the determination according to the present invention, e.g. so that there is no risk of speed limits being exceeded or of the vehicle entering a bend at undesirably high speed.

This LA function is often already implemented in today's vehicles, and data from it can be sent to the control unit 115 and/or 116 for use in determination of coming motive force needs and/or energy losses.

An example of an embodiment of the present invention uses these data about the road ahead of the vehicle in conjunction with vehicle data to determine that there is a reduced need for motive force and to determine whether the vehicle should be driven according to said first mode or said second mode, e.g. by calculating the vehicle speed on downhill runs where there is a reduced or no need for motive force, so that this speed is then used for choice of appropriate mode for driving of the vehicle.

Thus on the basis of data from said LA function, the control unit 115 and/or 116 can already determine, before the hillcrest, at a point where there is a relatively large need for motive force, that there will soon be a reduced need for motive force, and it can also relatively accurately calculate the highest speed which the vehicle will reach, on the basis of knowing its speed at the time, the gradient of the coming downgrade and the vehicle's aggregate energy losses on the coming downgrade.

An example of how this calculation may be done is referred to in the parallel Swedish patent application "FÖRFARANDE OCH ANORDNING FÖR FRAMFÖRANDE AV ETT FORDON II" (Swedish Application number 0950971-2, METHOD AND SYSTEM FOR DRIVING OF A VEHICLE) with the same filing date as the present application and the same applicant.

In determining the need for motive force it is also possible to use a method and a system for arriving at a parameter which comprises and takes into account a vehicle's running situation when determining its motive force capacity. Determination of such parameters is described in detail in the parallel Swedish patent application "METHOD FÖR BESTÄMNING AV DRIVKRAFTKAPACITET HOS ETT MOTORFORDON" (Swedish Application number 0950970-4, METHOD FOR DETERMINATION OF MOTIVE FORCE CAPACITY OF A MOTOR VEHICLE) with the same applicant and filing date as the present application.

The overdrive can thus be engaged in appropriate modes without engine signals having to be detected in order to determine that there is a low need for power output.

Similarly, downward gear changing may take place before actual need for power output arises if it is determined by using its look-ahead function that the vehicle is approaching an upgrade.

The present invention is described above in relation to a conventional gearbox. However, the invention is also applicable in the case of other types of gearbox, e.g. CVT (Continuous Variable Transmission) gearboxes, so long as the vehicle can run at a transmission ratio in which when cruising it runs at an engine speed which is below the lowest speed for torque plateau of the respective ratio.

In addition to the above advantages, the present invention has a further great advantage. Vehicles of the above type usually have an exhaust cleaning system to reduce emissions from the engine. However, these exhaust cleaning systems usually require a certain lowest temperature, e.g. 200° C., for them to function as desired. An engine which is trailed, i.e. not supplied with fuel, will fail to deliver warm exhaust gases to maintain the temperature in the exhaust cleaning system. On the contrary, air will be pumped all the time through the engine, and this relatively cold air will cool the exhaust cleaning system.

This cooling is directly related to the amount of air passing through the engine. Using said overdrive to run the engine at as low a speed as possible reduces also the amount of air during trailing, and hence also the cooling of the exhaust cleaning system, with less need for supplementary warming of the exhaust cleaning system.

However, the present invention affords a further advantage. As explained above, it is important for exhaust cleaning that the temperature in the exhaust cleaning system be maintained at at least a certain level to make it possible to ensure that the system functions well. Although trailing on overdrive as above results in less cold air passing through the engine, and in the cooling therefore being slower, it may still happen, e.g. on a long downhill run, that the temperature of the exhaust cleaning system drops to an undesirably low level and therefore needs raising. This temperature rise is easy to achieve when running on overdrive according to the present invention.

As explained above, $P=T\omega$. This means that to produce a certain power output it is necessary to generate a higher torque at lower engine speeds. Consequently a larger amount of fuel has to be injected to achieve desired torque, and hence power output, than at higher speeds. This larger amount of fuel leads to a higher exhaust temperature, raising the temperature in the exhaust cleaning system and contributing to a more effective post-treatment. This is particularly advantageous in situations where running on overdrive still requires a certain power output for the vehicle not to lose momentum.

The fact that, owing to the low engine speed, the gas flow is small also means that the engine's efficiency will be high, making it possible for the exhaust cleaning system to be warmed in a cost-effective way. Thus according to an embodiment of the present invention the power output delivered when running on overdrive may be controlled not only by need for motive force but also by need for warming of the vehicle's exhaust cleaning system, thereby obviating other, less cost-effective, warming measures.

The vehicle's speed has so far been described in absolute terms, but it should be noted that it may also be described in other ways, e.g. by determination of the vehicle's total kinetic energy, which may be done by the vehicle's control system. This type of speed representation is regarded as comprised within the term "(vehicle) (running) speed" in the present description and claims and is therefore also covered by the attached claims.

As mentioned above, on downgrades the vehicle's engine may be disconnected from its powered wheels when no torque contribution is required to maintain the vehicle's speed. The present invention may be also be combined with such a procedure, in which case the vehicle is driven either in overdrive as above or with the engine disconnected from the vehicle's powered wheels, depending on which is deemed the more advantageous.

That solution is described in detail in the parallel Swedish patent application "FÖRFARANDE OCH ANORDNING FÖR FRAMFÖRANDE AV ETT FORDON II" (Swedish Application number 0950971-2, METHOD AND SYSTEM FOR DRIVING OF A VEHICLE) with the same applicant and filing date as the present application.

The invention claimed is:

1. A method for driving of a vehicle having a gearbox which is connected to a combustion engine, wherein the gearbox can be set to different transmission ratios including a low transmission ratio in which the method is performed when a speed of an engine of the vehicle is below a minimum engine speed at which a maximum torque plateau for the low transmission ratio is reached, the vehicle being configured to be driven in a first mode or in a second mode at the low transmission ratio, such that, in the first mode, the vehicle is driven without fuel supply to the engine and in the second mode, the engine is provided with fuel supply to deliver motive force for propulsion of the vehicle, the method comprising:
mode determining whether the vehicle should be driven at the low transmission ratio in which the engine speed is below the minimum engine speed at which the maximum torque plateau for the low transmission ratio is reached, according to the first mode or the second mode, on the basis of a need for motive force supplied by the engine.

2. A method according to claim 1, wherein the mode determining is performed when the vehicle is being driven at the low transmission ratio or when the vehicle should be driven at the low transmission ratio.

3. A method according to claim 1, further comprising changing the vehicle to the low transmission ratio based on a need for motive force for propulsion of the vehicle.

4. A method according to claim 1, wherein the mode determining is performed by at least one control unit which forms part of the vehicle's control system.

5. A method according to claim 1, further comprising determining that a need for motive force supplied by the engine for the vehicle is reduced or will be reduced within a predetermined time before performing the mode determining at the time of or following the determining of the need for motive force.

6. A method according to claim 1, further comprising speed determining a speed of the vehicle for a location of the vehicle at a time subsequent to a time of the speed determining, and then further determining whether the vehicle should be run according to the first mode or the second mode based on the speed determined.

7. A method according to claim 1, further comprising determining a highest speed which the vehicle will reach during driving according to the first mode and/or the second mode, and then still further determining whether the vehicle should be run according to the first mode or the second mode based on the highest speed.

8. A method according to claim 1, wherein the mode determining is performed based on a need for motive force supplied by the engine for driving the vehicle, at a location of the vehicle at a time subsequent to a time at which the mode determining is performed.

9. A method according to claim 1, further comprising determining:
if the need for motive force fulfills a first criterion, then driving the vehicle according to the first mode, and
if the need for motive force fulfills a second criterion, then driving the vehicle according to the second mode.

10. A method according to claim 1, wherein the low transmission ratio has a form of a gear or transmission ratio setting for the gearbox, the gear or transmission ratio setting being such that the vehicle, at its cruising speed or maximum permissible speed, is driven with the engine speed which is below the minimum engine speed at which the maximum torque plateau for the gear or transmission ratio setting is reached.

11. A method according to claim 1, further comprising determining that there is or will within a predetermined time be a reduced need for motive force to propel the vehicle by using data concerning a gradient of a road ahead of the vehicle, and/or data concerning a topography of a road ahead of the vehicle, and/or a running resistance of the vehicle.

12. A method according to claim 11, further comprising driving the vehicle according to the first mode if the absolute amount of the running resistance of the vehicle is below a first value, and according to the second mode if the absolute value of the running resistance of the vehicle is below a second value which is different from the first value.

13. A method according to claim 1, further comprising determining a need for motive force by speed determining a speed parameter for the vehicle, and switching the gearbox to a higher transmission ratio than the low transmission ratio when said speed parameter fulfills a condition.

14. A method according to claim 13, wherein speed determining the speed parameter is performed by determining a change in the speed of the vehicle.

15. A method according to claim 14, wherein the change in the speed of the vehicle is determined by determining a derivative for the speed of the vehicle.

16. A method according to claim 1, further comprising performing a reduced power determination that there is or will within a predetermined time be a reduced need for power output for propulsion of the vehicle and then setting the gearbox to the low transmission ratio in response to the reduced power determination.

17. A method according to claim 16, wherein the reduced power determination that there is or will within a predetermined time be the reduced need for power output for propulsion of the vehicle is done by use of control signals from the engine and/or to the engine.

18. A method according to claim 1, further comprising, during driving of the vehicle in the first mode or the second mode, continuously monitoring whether there is and/or will within a predetermined time be a need for power output from the engine and, if there is and/or will be such a need, switching the gearbox to a higher transmission ratio.

19. A method according to claim 1, wherein the gearbox comprises a number of distinct gears and further comprising a step of switching the gearbox to a lower/higher transmission ratio by changing the gearbox to a higher/lower gear.

20. A method according to claim 1, wherein the mode determining of whether the vehicle should be driven according to the first mode or the second mode is done when the vehicle is being driven with an activated cruise control function.

21. A non-transitory computer-readable medium containing computer instructions stored therein for causing a computer processor to apply a method for driving of a vehicle having a gearbox which is connected to a combustion engine, wherein the gearbox can be set to different transmission ratios including a low transmission ratio in which the method is performed when a speed of an engine of the vehicle is below a minimum engine speed at which a maximum torque plateau for the low transmission ratio is reached, the vehicle being configured to be driven in a first mode or in a second mode at the low transmission ratio, such that, in the first mode, the vehicle is driven without fuel supply to the engine and in the second mode, the engine is provided with fuel supply to deliver motive force for propulsion of the vehicle, the method comprising:
  mode determining whether the vehicle should be driven at the low transmission ratio in which the engine speed is below the minimum engine speed at which the maximum torque plateau for the low transmission ratio is reached, according to the first mode or the second mode, on the basis of a need for motive force supplied by the engine.

22. A system for driving a vehicle comprising:
a gearbox connected to a combustion engine, the gearbox being configured to be set to different transmission ratios including a low transmission ratio in which a speed of an engine of the vehicle is below a minimum engine speed at which a maximum torque plateau for the low transmission ratio is reached; wherein
the vehicle is drivable in a first mode or a second mode at the low transmission ratio, such that, in the first mode, the vehicle is driven without fuel supply to the engine, and in the second mode, the engine is provided with fuel supply to deliver motive force for propulsion of the vehicle, the system further comprising:
a determining apparatus configured to determine whether the vehicle should be driven at the low transmission ratio at which the engine speed is below the minimum engine speed at which the maximum torque plateau for the low transmission ratio is reached, according to the first mode or the second mode, on the basis of a need for motive force supplied by the engine.

23. A vehicle comprising:
a gearbox connected to a combustion engine, the gearbox being configured to be set to different transmission ratios including a low transmission ratio in which a speed of an engine of the vehicle is below a minimum engine speed at which a maximum torque plateau for the low transmission ratio is reached; wherein
the vehicle is drivable in a first mode or a second mode at the low transmission ratio, such that, in the first mode, the vehicle is driven without fuel supply to the engine, and in the second mode, the engine is provided with fuel supply to deliver motive force for propulsion of the vehicle, the system further comprising:
a determining apparatus configured to determine whether the vehicle should be driven at the low transmission ratio at which the engine speed is below the minimum engine speed at which the maximum torque plateau for the low transmission ratio is reached, according to the first mode or the second mode, on the basis of a need for motive force supplied by the engine.

* * * * *